United States Patent [19]
Nitta et al.

[11] 3,732,117
[45] May 8, 1973

[54] DIELECTRIC CERAMIC COMPOSITION COMPRISING LEAD-LANTHANUM TITANATE SOLID SOLUTION

[75] Inventors: Tsuneharu Nitta; Hiromitsu Taki, both of Osaka; Kaneomi Nagase, Kyoto, all of Japan

[73] Assignee: Matsushita Electric Industrial Co., Ltd., Kadoma, Osaka, Japan

[22] Filed: Mar. 24, 1971

[21] Appl. No.: 127,836

[30] Foreign Application Priority Data

Apr. 2, 1970 Japan..........................45/28414
May 19, 1970 Japan..........................45/43182
June 9, 1970 Japan..........................45/50068

[52] U.S. Cl................106/73.2, 252/63.5, 252/520
[51] Int. Cl............................................C04b 33/00
[58] Field of Search...................106/39 R; 252/63.5, 252/518, 528; 317/258

[56] References Cited

UNITED STATES PATENTS

| | | | |
|---|---|---|---|
| 2,985,700 | 5/1961 | Johnston | 106/39 R |
| 3,268,783 | 8/1966 | Saburi | 106/39 R |
| 3,256,499 | 6/1966 | Khouri et al. | 252/520 |
| 3,292,062 | 12/1966 | Gallagher et al. | 106/39 R |
| 2,908,579 | 10/1959 | Nelson et al. | 106/39 R |
| 2,289,211 | 7/1942 | Ridgway | 106/39 R |
| 3,440,067 | 4/1969 | Fujiwara et al. | 106/39 R |

FOREIGN PATENTS OR APPLICATIONS

| | | | |
|---|---|---|---|
| 933,419 | 8/1963 | Great Britain | 106/39 R |

OTHER PUBLICATIONS

Saburi, O; Semiconducting Bodies in the Family of Barium Titanates; J. Amer. Chem. Soc., 44 (2) July 1961, pp. 54–63.

Gallagher, et al.; Preparation of Semiconducting Titanates; J. Amer. Chem. Soc., 46(8) August 1963, pp. 359–365

*Primary Examiner*—L. Dewayne Rutledge
*Assistant Examiner*—W. R. Satterfield
*Attorney*—Wenderoth, Lind & Ponack

[57] ABSTRACT

Dielectric ceramic having a high dielectric constant and a low dielectric loss over a wide frequency range of 1 kHz to 30 MHz, a small temperature coefficient of dielectric constant, high stability with time, a high breakdown voltage and high mechanical strength is a sintered mixture composed essentially of 65 to 96 percent by weight of $BaTiO_3$, 3 to 20 percent by weight of $[Pb_{1-x}La_{2x(1-y)}Ti_{1+xy-x}O_{3-xy}]$ (where $x$ is a 0.15 to 0.8 mole and $y$ is 0.5 to 0.9 mole), 1 to 15 percent by weight of $BaZrO_3$, and/or, as additives, up to 10 percent by weight of at least one additive selected from the group consisting of $Bi_2O_3$, $Bi_2(TiO_3)_3$, $Bi_2(SnO_5)$, $Bi_2(ZrO_3$ and $SiO_2$.

7 Claims, No Drawings

DIELECTRIC CERAMIC COMPOSITION COMPRISING LEAD-LANTHANUM TITANATE SOLID SOLUTION

The present invention relates to novel ceramic materials which are used for capacitors, and more particularly to novel dielectric ceramic compositions comprising barium titanate, lead lanthanum titanate, barium zirconate, and/or, as additives, at least one additive selected from the group consisting of bismuth oxide, bismuth titanate, bismuth stannate, bismuth zirconate, and silicon oxide.

The electronics industry requires a high dielectric material for making capacitors operating at high frequencies, for example, in a range of 1 to 30 MHz. It is important in making such capacitors that the dielectric materials have a high dielectric constant and a low dielectric loss over a wide frequency range, a small temperature coefficient of dielectric constant, high stability with time, and a high breakdown voltage.

Although the conventional dielectric ceramics such as barium titanate are characterized by a high dielectric constant, they are not suitable for use in high frequency capacitors in the afore-indicated megahertz range because of having a large dielectric loss at frequencies above 1 MHz.

In order to meet present-day demands, the upper frequency limit should be higher than the conventional limit and preferably at least 30 MHz, without disturbing and even improving the other desirable properties of ceramic dielectric materials.

Besides, modern electronics tends toward the miniaturization and molding of circuits, and for use in thin film capacitors, for example, it is desirable that dielectric materials have high mechanical strength.

Accordingly, a principal object of the present invention is to provide novel dielectric materials in the form of ceramics having a high dielectric constant and a low dielectric loss in a frequency range of at least up to 30 MHz.

A further object of the present invention is to provide dielectric ceramics characterized by a high dielectric constant, a low dielectric loss, a small temperature coefficient of dielectric constant over a wide temperature interval, high stability with time, high breakdown voltage, and a high mechanical strength.

These and other objects of this invention will become apparent upon consideration of the following detailed description.

In accordance with the present invention, it has been discovered that a ceramic material of a fired combination composed essentially of 65 to 96 percent by weight of barium titanate ($BaTiO_3$), 3 to 20 percent by weight of lead lanthanum titanate ($Pb_{1-x}La_{2x(1-y)}Ti_{1+xy-x}O_{3-xy}$; where $x$ is 0.15 to 0.8 mole and barium to 0.9 mole), 1 to 15 percent by weight of barium zirconate ($BaZrO_3$), and/or, as additives, up to 10 percent by weight of at least one additive selected from the group consisting essentially of bismuth oxide ($Bi_2O_3$), bismuth titanate $[Bi_2(TiO_3)_3]$, bismuth stannate $[Bi_2SnO_5]$, bismuth zirconate $[Bi_2(ZrO_3)_3]$, and silicon oxide ($SiO_2$) has a high dielectric constant and a low dielectric loss over a wide frequency range, a small temperature coefficient of dielectric constant, high stability with time, a high breakdown voltage, and high mechanical strength.

The component oxides are intimately mixed in the desired composition proportions and fired in accordance with a schedule set forth hereinafter for production of a fired ceramic body.

The raw materials for the ceramics are commercially pure grade barium titanate ($BaTiO_3$), barium zirconate ($BaZrO_3$) and silicon oxide ($SiO_2$), reagent grade lead oxide (PbO), titanium oxide ($TiO_2$) and tin oxide ($SnO_2$), and high purity zirconium oxide ($ZrO_2$), bismuth oxide ($Bi_2O_3$) and lanthanum oxide ($La_2O_3$). Any compound which is converted upon firing to the corresponding barium titanate, barium zirconate, lead oxide, titanium oxide, zirconium oxide, tin oxide, bismuth oxide, lanthanum oxide or silicon oxide can be used as a raw material. Batches of the raw materials are ball milled with a small amount of water for intimate mixing and then dried. Usually they are pressed loosely into a pellet form and calcined at a temperature of 750° to 950° C, for 2 hours in a covered platinum crucible. The calcined product is then powdered thoroughly and a few drops of distilled water are added to the powder. The powder is formed into discs. These discs are fired at a temperature ranging from 1,300° to 1,400° C for 2 hours, and then they are cooled at "furnace power off."

Silver paste is fired on the disc surfaces to form electrodes in a per se conventional manner and then tested for dielectric properties.

The temperature coefficient of dielectric constant is obtained by measuring the capacitance over a range of temperature of −55° to +150° C and the variation is expressed by percentages in comparison with the value at 20° C.

A breakdown voltage test is performed in silicon oil at 100° C by applying a dc voltage.

A capacitance life test is carried out in a thermostat at 60° C and more than 95 percent relative humidity for 1,000 hours and the variation in the value of capacitance is expressed by percentages.

Mechanical strength is measured in a per se conventional manner.

According to the present invention, it has been discovered that the following base compositions indicated in Table I can provide high dielectric constant materials having, particularly, a lower dielectric loss at frequencies of up to 30 MHz.

TABLE I

| Composition | Preferable % by weight |
|---|---|
| $BaTiO_3$ | 65 to 96 |
| $Pb_{1-x}La_{2x(1-y)}Ti_{1+xy-x}O_{3-xy}$ | 3 to 20 |
| $BaZrO_3$ | 1 to 15 |

In the formula shown in Table I, $x$ has a value of from 0.15 to 0.8 mole and $y$ has a value of from 0.5 to 0.9 mole.

The room temperature dielectric constant and dielectric loss over a range of 1 KHz to 30 MHz of dielectric elements employing the ceramic materials in accordance with the present invention are shown as a function of compositions in Table II.

TABLE II

| No. | Composition (percent by weight) | | | Dielectric property (at 20° C.) | | | | | |
|---|---|---|---|---|---|---|---|---|---|
| | | | | Dielectric constant | | | Dielectric loss (×10⁻⁴) | | |
| | $BaTiO_3$ | $Pb_{1-x}La_{2x(1-y)}$-$Ti_{1+xy-x}O_{3-xy}$* | $BaZrO_3$ | 1 kHz. | 1 mHz. | 30 mHz. | 1 kHz. | 1 mHz. | 30 mHz. |
| 1** | 97 | 2.5 | 0.5 | 1,240 | 1,280 | 1,310 | 180 | 210 | 680 |
| 2 | 96 | 3.0 | 1.0 | 1,750 | 1,830 | 1,900 | 87 | 90 | 100 |
| 3 | 88 | 7.0 | 5.0 | 3,860 | 4,000 | 4,040 | 103 | 108 | 120 |
| 4 | 84 | 12 | 4.0 | 2,840 | 2,960 | 3,010 | 70 | 60 | 58 |
| 5** | 82 | 18 | 0.0 | 800 | 1,000 | 1,560 | 240 | 1,100 | 1,740 |
| 6 | 82 | 5.0 | 13 | 5,030 | 5,120 | 5,300 | 115 | 128 | 148 |
| 7 | 82 | 3.0 | 15 | 5,460 | 5,610 | 5,700 | 98 | 105 | 130 |
| 8 | 80 | 19 | 1.0 | 2,100 | 2,150 | 2,230 | 64 | 80 | 84 |
| 9** | 73 | 10 | 17 | 3,500 | 3,650 | 3,800 | 482 | 970 | 1,400 |
| 10** | 72 | 21 | 7.0 | 700 | 1,500 | 1,800 | 120 | 142 | 165 |
| 11 | 72 | 16 | 12 | 2,760 | 2,820 | 2,900 | 40 | 36 | 30 |
| 12** | 65 | 20 | 15 | 1,500 | 1,680 | 1,750 | 52 | 41 | 37 |

*$x$ is 0.35 mole and $y$ is 0.70 mole.
**These samples are illustrations to indicate the poorer properties of dielectric ceramics which are outside the scope of the present invention.

Table II shows that the compositions within the range of Table I exhibit excellent dielectric properties. On the other hand, a dielectric material containing more than 96 percent by weight of $BaTiO_3$ has a lower dielectric constant and a larger dielectric loss at high frequency. A decrease in the proportion of $BaTiO_3$ below 65 percent by weight results in a dielectric material having a lower dielectric constant. An increase in the proportion of $BaZrO_3$ above 15 percent by weight results in a sintered body having a larger dielectric loss. Variation by way of a decrease from 1 percent by weight of $BaZrO_3$ results in a poorly sintered body. An increase in the proportion of $Pb_{1-x}La_{2x(1-y)}Ti_{1+xy-x}O_{3-xy}$ (where $x$ is 0.15 to 0.8 mole and $y$ is 0.5 to 0.9 mole) above 20 percent by weight results in a dielectric material having an extremely low dielectric constant. A dielectric material containing less than 3 percent by weight of $Pb_{1-x}La_{2x(1-y)}Ti_{1+xy-x}O_{3-xy}$ (where $x$ is 0.15 to 0.8 mole and $y$ is 0.5 to 0.9 mole) results in a very poorly sintered body.

Turning now to a discussion of the $Pb_{1-x}La_{2x(1-y)}Ti_{1+xy-x}O_{3-xy}$ component with which the present invention is particularly concerned, it has been found that $Pb_{1-x}La_{2x(1-y)}Ti_{1+xy-x}O_{3-xy}$, in which $x$ has a value of 0.15 to 0.8 mole and $y$ has a value of 0.5 to 0.9 mole, shows a single phase solid solution with a perovskite-type cubic symmetry. The fired combinations of $Pb_{1-x}La_{2x(1-y)}Ti_{1+xy-x}O_{3-xy}$ existing in such a single phase, $BaTiO_3$ and $BaZrO_3$ exhibit an excellent dielectric property. In the $Pb_{1-x}La_{2x(1-y)}Ti_{1+xy-x}O_{3-xy}$ outside the above limited range, there appear other phases in addition to the perovskite-type cubic phase and resultant fired combinations of the $Pb_{1-x}La_{2x(1-y)}Ti_{1+xy-x}O_{3-xy}$, $BaTiO_3$ and $BaZrO_3$ show a poor dielectric property.

Table III shows the room temperature dielectric constant and dielectric loss over a range of 1 KHz to 30 MHz for the ceramic materials in accordance with the present invention as a function of compositions.

It has been further discovered according to the present invention that said base compositions are preferably improved in the dielectric property, particularly a life characteristic of capacitance, by adding up to 10% by weight of at least one additive selected from the group consisting essentially of bismuth oxide ($Bi_2O_3$), bismuth titanate [$Bi_2(TiO_3)_3$], bismuth stannate [$Bi_2SnO_5$], and bismuth zirconate [$Bi_2(ZrO_3)_2$]. The ceramic specimens of these compositions show a slight change in a life test of capacitance with time, while the other dielectric properties still remain at a relatively high value. The room temperature dielectric constant and dielectric loss at a frequency of 30 MHz and the variation of capacitance with time of dielectric elements employing ceramic materials in accordance with the present invention are shown in Table IV.

TABLE III

| No. | Variation of x and y in* $Pb_{1-x}La_{2x(1-y)}Ti_{1+xy-x}O_{3-xy}$ (mole) | | Dielectric property (at 20° C.) | | | | | |
|---|---|---|---|---|---|---|---|---|
| | | | Dielectric constant | | | Dielectric loss (×10⁻⁴) | | |
| | Value of x | Value of y | 1 kHz. | 1 mHz. | 30 mHz. | 1 kHz. | 1 mHz. | 30 mHz. |
| 13** | 0.14 | 0.51 | 865 | 1,000 | 1,540 | 240 | 320 | 580 |
| 14 | 0.15 | 0.50 | 2,200 | 2,300 | 2,330 | 100 | 107 | 110 |
| 15** | 0.33 | 0.45 | 1,240 | 1,360 | 1,520 | 260 | 335 | 450 |
| 16 | 0.35 | 0.70 | 3,050 | 3,100 | 3,200 | 80 | 62 | 41 |
| 17 | 0.39 | 0.80 | 3,000 | 3,100 | 3,200 | 88 | 82 | 70 |
| 18 | 0.52 | 0.64 | 2,730 | 2,810 | 2,980 | 85 | 80 | 65 |
| 19 | 0.58 | 0.50 | 2,150 | 2,200 | 2,300 | 124 | 132 | 140 |
| 20** | 0.58 | 0.91 | 2,430 | 2,650 | 2,820 | 150 | 200 | 500 |
| 21 | 0.55 | 0.90 | 2,730 | 2,810 | 2,900 | 90 | 130 | 150 |
| 22 | 0.57 | 0.75 | 2,580 | 2,760 | 2,810 | 103 | 96 | 92 |
| 23 | 0.71 | 0.72 | 2,440 | 2,520 | 2,600 | 65 | 82 | 100 |
| 24 | 0.80 | 0.73 | 2,100 | 2,300 | 2,350 | 68 | 90 | 105 |
| 25** | 0.81 | 0.73 | 1,470 | 1,500 | 1,610 | 140 | 250 | 460 |

*Each above composition is composed of 80% by weight of $BaTiO_3$, 12% by weight of $Pb_{1-y}La_{2x(1-y)}Ti_{1+xy-x}O_{3-xy}$, and 8% by weight of $BaZrO_3$, respectively.
**These samples are illustrations to indicate the poorer properties of dielectric ceramics which are outside the scope of the present invention.

TABLE IV

| Number | Additives (percent by weight) | | | | Dielectric property | | |
|---|---|---|---|---|---|---|---|
| | $Bi_2O_3$ | $Bi_2(TiO_3)_3$ | $Bi_2SnO_5$ | $Bi_2(ZrO_3)_3$ | Dielectric constant at 20° C. and 30 MHz | Dielectric loss at 20° C. and 30 MHz ($\times 10^{-4}$) | Varied value of capacitance after for 1,000 hrs. at 60 PC and 95% rh. (%) |
| 16 | | | | | 3,200 | 41 | 14.2 |
| 26 | 0.05 | | | | 3,320 | 43 | 8.8 |
| 27 | 0.10 | | | | 3,300 | 45 | 4.7 |
| 28 | 1.5 | | | | 3,350 | 43 | 2.5 |
| 29 | 5.0 | | | | 3,180 | 40 | 3.2 |
| 30 | 10.0 | | | | 2,760 | 52 | 8.6 |
| 31** | 11.0 | | | | 1,720 | 121 | 11.0 |
| 32 | | 1.5 | | | 2,980 | 47 | 2.8 |
| 33 | | 5 | | | 2,870 | 45 | 3.1 |
| 34 | | | 1.5 | | 3,910 | 46 | 2.5 |
| 35 | | | | 1.5 | 2,720 | 43 | 3.0 |

* Each above basic composition is composed of 80% by weight of $BaTiO_3$, 12% by weight of $Pb_{1-x}La_{2x(1-y)}Ti_{1+xy-x}O_{3-xy}$ (where x is 0.35 mole and y is 7.0 mole) and 8% by weight of $BaZrO_3$, respectively.
** The sample is an illustration to indicate the poorer properties of a dielectric ceramic which is outside the scope of the present invention.

Table IV shows that the composition in accordance with the present invention exhibits excellent stability with time.

Moreover, according to the present invention, it has been discovered that the addition of silicon oxide ($SiO_2$) to said basic composition improves remarkably the mechanical strength. Good results are obtained by an addition of up to 10 percent by weight of silicon oxide ($SiO_2$) to said basic composition. Table V shows the room temperature dielectric constant and dielectric loss at 30 MHz, and the mechanical strength of the dielectric ceramic materials according to this embodiment of the present invention.

TABLE V

| No. | *Additives (% by weight) $SiO_2$ | Property Dielectric constant at 20°C, and 30MHz | Dielectric loss at 20°C and 30MHz ($\times 10^{-4}$) | Mechanical strength (kg/cm²) |
|---|---|---|---|---|
| 16 | | 3200 | 41 | 1140 |
| 36 | 0.5 | 3230 | 56 | 1450 |
| 37 | 1.0 | 3000 | 42 | 1820 |
| 38 | 5.0 | 2810 | 41 | 2250 |
| 39 | 10.0 | 2540 | 42 | 2460 |
| 40** | 11.0 | 1540 | 42 | 2580 |

* Each above basic composition is composed of 80% by weight of $BaTiO_3$, 12% by weight of $Pb_{1-x}La_{2x(1-y)}Ti_{1+xy-x}O_{3-xy}$ (where x is 0.35 mole and y is 0.70 mole), and 8% by weight of $BaZrO_3$, respectively.
** The sample is an illustration to indicate the poorer properties of a dielectric ceramic which is outside the scope of the present invention.

The composition within the range of the present invention shows a higher mechanical strength and a relatively high dielectric property.

Another important property contributing to the usefulness of the dielectric materials according to the present invention is that the temperature coefficient of dielectric constant is small over a wide temperature range and the breakdown voltage is high at a high temperature.

Table VI shows the temperature coefficient of dielectric constant and the breakdown voltage at 100° C for ceramic materials in accordance with the present invention.

TABLE VI

| No. | Property Temperature coefficient of dielectric constant (−55°C to +15°C) (%) | | Breakdown voltage at 100°C (kv/mm) |
|---|---|---|---|
| | −55°C | +150°C | |
| 4 | ±0 | +3.3 | 36.6 |
| 11 | +2.1 | −2 | 29.6 |
| 16 | −1.0 | −1.5 | 27.5 |
| 29 | −3.2 | +3.0 | 31.1 |
| 32 | −1.4 | −0.9 | 32.0 |
| 34 | −1.6 | −1.2 | 30.0 |
| 35 | −2.0 | ±0 | 35.8 |
| 38 | −0.8 | −1.4 | 37.5 |

As seen in Table VI, the temperature coefficient of dielectric constant of the compositions in accordance with the present invention are very small over the wide temperature range of −55° to +150° C and the breakdown voltage is more than 20 kV/mm at a relatively high temperature of 100° C.

The dielectric compositions according to the present invention can be used for making dielectric capacitors for wide frequency use, for example, coupling or bypass capacitors.

What is claimed is:

1. A dielectric ceramic composition comprising a sintered mixture consisting essentially of, 65 to 96 percent by weight of $BaTiO_3$, 3 to 20 percent by weight of $Pb_{1-x}La_{2x(1-y)}Ti_{1+xy-x}O_{3-xy}$ solid solution in perovskite form wherein x has a value of from 0.15 to 0.8 mole and y has a value of from 0.5 to 0.9 mole and 1 to 15 percent by weight of $BaZrO_3$.

2. A dielectric ceramic composition according to claim 1, wherein said sintered mixture further includes up to 10 percent by weight of at least one additive selected from the group consisting of $Bi_2O_3$, $Bi_2(TiO_3)_3$, $Bi_2SnO_5$, $Bi_2(ZrO_3)_3$ and $SiO_2$.

3. A dielectric ceramic composition according to claim 2 wherein said additive consists essentially of $Bi_2O_3$.

4. A dielectric ceramic composition according to claim 2 wherein said additive consists essentially of $Bi_2(TiO_3)_3$.

5. A dielectric ceramic composition according to claim 2 wherein said additive consists essentially of $Bi_2SnO_5$.

6. A dielectric ceramic composition according to claim 2 wherein said additive consists essentially of $Bi_2(ZrO_3)_3$.

7. A dielectric ceramic composition according to claim 2 wherein said additive consists essentially of $SiO_2$.

* * * * *